(12) United States Patent
Ju

(10) Patent No.: US 7,409,093 B2
(45) Date of Patent: Aug. 5, 2008

(54) METHOD AND APPARATUS FOR ENCODING VIDEO SIGNALS

(75) Inventor: Chi-Cheng Ju, Hsin-Chu (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 922 days.

(21) Appl. No.: 10/711,814

(22) Filed: Oct. 7, 2004

(65) Prior Publication Data

US 2005/0078749 A1   Apr. 14, 2005

(30) Foreign Application Priority Data

Oct. 8, 2003   (TW) .............................. 92128000 A

(51) Int. Cl.
G06K 9/36   (2006.01)
G06K 9/46   (2006.01)

(52) U.S. Cl. ...................... 382/232; 382/236; 382/239

(58) Field of Classification Search ................. 382/232, 382/236, 239; 375/240.02, 240.16; 386/33, 386/109, 111

See application file for complete search history.

(56) References Cited

U.S. PATENT DOCUMENTS

| | | | | |
|---|---|---|---|---|
| 6,028,612 A | * | 2/2000 | Balakrishnan et al. | 345/544 |
| 6,163,576 A | * | 12/2000 | Lempel | 375/240.24 |
| 6,388,968 B1 | | 5/2002 | Ohta et al. | |
| 6,442,206 B1 | * | 8/2002 | Hrusecky | 375/240.21 |
| 7,043,745 B2 | * | 5/2006 | Nygren et al. | 725/9 |

FOREIGN PATENT DOCUMENTS

CN   1306724 A   8/2001
JP   8-205109   8/1996

* cited by examiner

*Primary Examiner*—Phuoc Tran
(74) *Attorney, Agent, or Firm*—Winston Hsu

(57) ABSTRACT

A method for a video encoder to encode video data into a video bit stream, the video data includes at least a picture, the picture includes a plurality of blocks, the method includes: receiving an available memory bandwidth value; determining an encoding type for the block according to the available memory bandwidth value; and encoding the block using the encoding type.

40 Claims, 4 Drawing Sheets

METHOD AND APPARATUS FOR ENCODING VIDEO SIGNALS

BACKGROUND

The present invention relates to a method and apparatus for encoding video signals, and more particularly, to a method and apparatus for adaptively adjusting the encoding type of video data to be encoded depending upon an available memory bandwidth for the video encoder.

As the operation speed of electronic components increases, video data processing, which consumes considerable computing resource of a system, becomes an important subject. In general, the video data processing standard provides various encoding types to support different requirements of video processing. For example, in the MPEG (moving picture experts group) 2 standard, a picture is compressed by eliminating spatial redundancies and temporal redundancies.

In general, there are some spatial similarities in chromatic, geometrical, or other characteristic values within a picture/image. In order to eliminate these spatial redundancies, it is required to identify significant elements of the picture and to remove the redundant elements that are less significant. For example, according to the MPEG 2 standard, a picture is compressed by eliminating the spatial redundancies by chrominance sampling, discrete cosine transform (DCT) and quantization. In addition, video data is actually a continuous series of pictures, which are perceived as a moving picture due to the persistence of pictures in the vision of human eyes. Since the time interval between pictures is very short, the difference between neighboring pictures is generally little and mostly appears in change of location of visual objects. Therefore, the MPEG 2 standard eliminates temporal redundancies caused by the similarity between pictures to further compress the video data.

In order to eliminate the temporal redundancies mentioned above, a process referred to as motion compensation is employed in the MPEG 2 standard. Before performing motion compensation, a current picture to be processed is typically divided into 16×16 pixel sized macroblocks (MB). For each current macroblock, a most similar prediction block of a reference picture is then determined by comparing the current macroblock with "candidate" macroblocks of a preceding picture or a succeeding picture. The most similar prediction block is treated as a reference block and the location difference between the current block and the reference block is then recorded as a motion vector. The above process of obtaining the motion vector is referred to as motion estimation. If the picture to which the reference block belongs is prior to the current picture, the process is called forward prediction. If the reference picture is posterior to the current picture, the process is called backward prediction. In addition, if the motion vector is obtained by referring both to a preceding picture and a succeeding picture of the current picture, the process is called bi-directional prediction. A common employed motion estimation method is a block-matching method. Additionally, because the reference block are probably not completely the same as the current block, it is required to calculate the difference between the current block and the reference block, which is also referred to as a prediction error. The prediction error is used for decoding the current block.

The MPEG 2 standard defines three encoding types to encode a picture: intra encoding, predictive encoding, and bi-directionally predictive encoding. An intra-coded picture (I-picture) is encoded independently without referring to a preceding picture or a succeeding picture. A predictive picture (P-picture) is encoded by referring to a preceding picture, where the preceding picture could be an I-picture or a P-picture. A bi-directionally predictive picture (B-picture) is encoded by referring to both a preceding picture and a succeeding picture.

Since no neighboring pictures are referred to when encoding an I-picture, less memory bandwidth is required. A reference picture is referred to when encoding a P-picture, so more memory bandwidth is required. Two reference pictures are referred to when encoding a B-picture, and therefore even more memory bandwidth is required.

A picture is composed of a plurality of macro-blocks, and the picture is encoded macro-block by macro-block. Each macro-block has a corresponding motion type parameter representing its motion compensation type. In the MPEG 2 standard, for example, each macro-block in the I-picture is intra-coded. The P-picture includes intra-coded and forward motion compensated macro-blocks. The B-picture may include intra-coded, forward motion compensated, backward motion compensated, and bi-directional motion compensated macro-blocks. As is well known in the art, an intra-coded macro-block is independently encoded without referring to other macro-blocks in a preceding picture or a succeeding picture. A forward motion compensated macro-block is encoded by referring to the forward prediction information of a most similar macro-block in the preceding picture. A bi-directional motion compensated macro-block is encoded by referring to the forward prediction information of a reference macro-block in the preceding picture and the backward prediction information of another reference macro-block in the succeeding picture.

As mentioned above, since the intra-coded macro-block is encoded without referring to other macro-blocks in the preceding picture or the succeeding picture, the required memory bandwidth while encoding an intra-coded macro-block is lower than other types of macro-block. While encoding the forward motion compensated macro-block, it is required to refer to a reference macro-block in the preceding picture so more memory bandwidth is required. Similarly, while encoding the bi-directional motion compensated macro-block, it is required to refer to both a reference macro-block in a preceding picture and another reference macro-block in a succeeding picture so it requires even more memory bandwidth.

In addition, the required memory bandwidth while encoding a macro-block not only relates to the encoding type but also relates to the motion estimation method employed thereof.

A conventional block-matching process of motion estimation is shown in FIG. 1. A current picture 120 is divided into blocks as shown in FIG. 1. Each block can be of any size. In the MPEG standard, for example, the current picture 120 is typically divided into macro-blocks with 16×16 pixels. Each block in the current picture 120 is encoded in terms of its difference from a block in a preceding picture 110 or a succeeding picture 130. During the block-matching process of a current block 100, the current block 100 is compared with similar-sized "candidate" blocks within a search range 115 of the preceding picture 110 or within a search range 135 of the succeeding picture 130. The candidate block of the preceding picture 110 or the succeeding picture 130 that is determined to have the smallest difference with respect to the current block 100, e.g. a block 150 of the preceding picture 110, is selected as a reference block. The motion vectors and residues between the reference block 150 and the current block 100 are computed and coded. As a result, the current block 100 can be restored during decompression using the coding of the reference block 150 as well as the motion vectors and residues for the current block 100.

A block-matching algorithm that compares the current block to every candidate block within the search range is called a "full search block-matching algorithm." In general, a larger search area produces a better motion vector. However, the required memory bandwidth of a full search block-matching algorithm is proportional to the size of the search area. For example, if a full search block-matching algorithm is applied on a macroblock of size 16×16 pixels over a search range of ±N pixels with one pixel accuracy, it requires $(2 \times N+1)^2$ block comparisons. For N=16, 1089 16×16 block comparisons are required. Because each block comparison requires 16×16, or 256 calculations, this algorithm consumes considerable memory bandwidth and is computationally intensive.

FIG. 2 depicts a simplified schematic diagram of a video encoding/decoding system 10 according to the related art. The encoding/decoding system 10 includes a video encoder 12, a video decoder 14, an audio codec 16, a control unit 18, a memory management unit 20, a display controller 22, and a memory 24. As shown in FIG. 2, in the conventional encoding/decoding system 10, all components share the memory 24 via the memory management unit 20. Each of the video encoder 12, the video decoder 14, and the audio codec 16 would need to access the memory 24 via the memory management unit 20. The system memory could be an external DRAM located outside the video encoding device 10, and the memory management unit 20 could be a DRAM controller for accessing the external DRAM.

In order to overcome the disadvantages of the full search block-matching algorithm, a three-step hierarchical search algorithm is described by H. M. Jong et al. in "Parallel Architectures for 3-Step Hierarchical Search Block-Matching Algorithm," IEEE Trans. On Circuits and Systems for Video Technology, Vol. 4, August 1994, pp. 407-416. In a first stage, a coarse search is performed over a reasonably large area. In successive stages of a conventional hierarchical search, the size of the search area is reduced. For the same search range, the hierarchical search method uses less memory bandwidth and computations than the full search method but results in deterioration of the image quality.

In U.S. Pat. No. 5,731,850, Maturi et al. disclose a combination of the full search method and the hierarchical search method. The search range is determined according to the encoding type of the current picture. If the search range is larger than a threshold, the hierarchical search method is adopted to implement the block-matching process. If the search range is less than or equal to the threshold, the full search method is adopted to implement the block-matching process. In this way, the image quality and system performance are thereby balanced. Note that in the method of Maturi et al., the way to perform the block-matching process is dependent upon the size of the search range. However, if the system memory bandwidth is limited, when the required memory bandwidth of the video encoder is dramatically increased, the method of Maturi et al. cannot guarantee that the required memory bandwidth does not exceed the available memory bandwidth for the video encoder. As a result, the encoding performance is therefore decreased and the requirement of real-time encoding may not achieved due to the system memory not being capable of supporting such a high memory bandwidth.

SUMMARY

It is therefore an objective of the present invention to provide a method for a video encoder to encode video data so that a required memory bandwidth while encoding the video data does not exceed the available memory bandwidth for the video encoder.

According to an exemplary embodiment of the present invention, a method for a video encoder to encode video data including at least a picture into a video bit stream is disclosed. The method comprises: receiving an available memory bandwidth value; determining an encoding type for the picture according to the available memory bandwidth value; and encoding the picture using the encoding type.

According to an exemplary embodiment of the present invention, a method for a video encoder to encode video data into a video bit stream is disclosed. The video data includes at least a picture, and the picture includes a plurality of blocks. The method comprises: receiving an available memory bandwidth value; determining an encoding type for the block according to the available memory bandwidth value; and encoding the block using the encoding type.

According to an exemplary embodiment of the present invention, an apparatus for encoding video data into a video bit stream is disclosed comprising means for receiving an available memory bandwidth value; means for determining an encoding type for the video bit stream according to the available memory bandwidth value; and means for encoding the video bit stream using the encoding type.

According to an exemplary embodiment of the present invention, a video encoder for encoding video data into a video bit stream is disclosed comprising a video interface for receiving the video data; and an encoding module electrically connected to the video interface for adaptively determining an encoding type for the video bit stream according to an available memory bandwidth value, and then for encoding the picture using the encoding type.

One advantage of the present invention is that the required memory bandwidth while encoding the video data does not exceed the maximum available memory bandwidth for the video encoder so the requirement of real-time encoding is achieved.

Another objective of the present invention is to provide a method for performing a motion estimation on a block of a picture in order to guarantee that a required memory bandwidth does not exceed an available memory bandwidth.

According to an exemplary embodiment of the present invention, a method for performing a motion estimation on a block of a picture is disclosed comprising: receiving an available memory bandwidth value; determining a motion estimation type and a search range associated with the motion estimation type for the block according to the available memory bandwidth value; and performing the motion estimation on the block according to the motion estimation type and the search range.

According to an exemplary embodiment of the present invention, an apparatus for performing a motion estimation on a block of a picture is disclosed comprising first means for receiving an available memory bandwidth value; second means for determining a motion estimation type and a search range associated with the motion estimation type for the block according to the available memory bandwidth value; and third means for performing the motion estimation on the block according to the motion estimation type and the search range.

One advantage of the present invention is that the required memory bandwidth while performing motion estimation on a block of a picture does not exceed the available memory bandwidth so the requirement of real-time motion estimation is achieved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
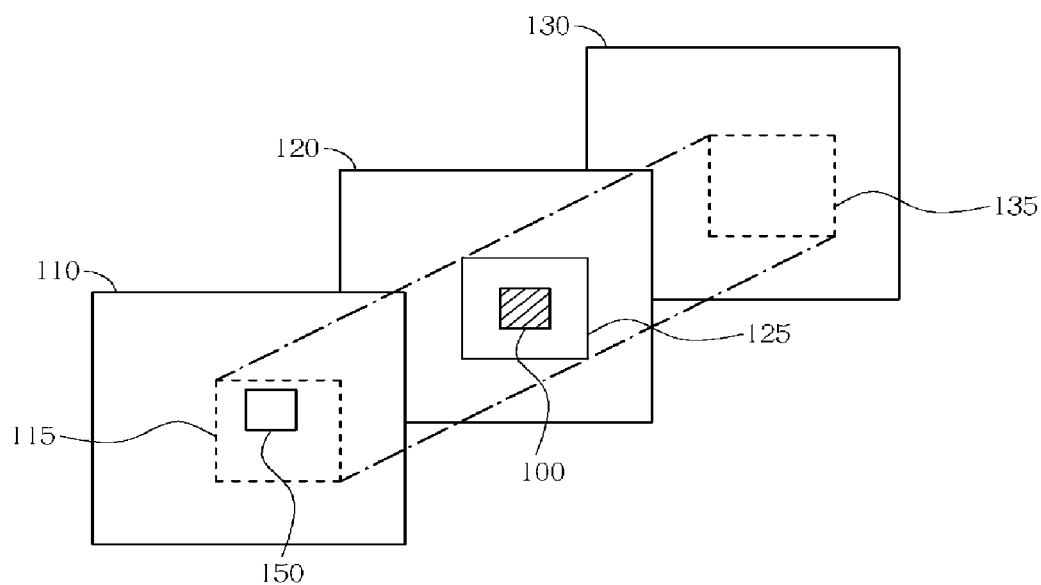
FIG. 1 is a schematic diagram of a block-matching process of motion estimation according to the related art.
Figure 2:
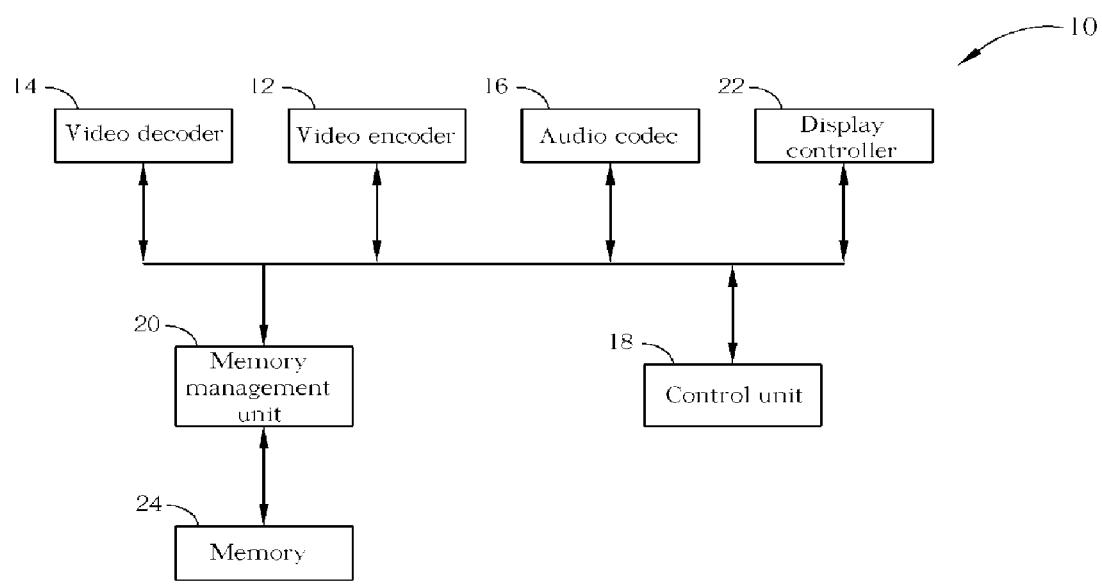
FIG. 2 is a simplified schematic diagram of a video encoding/decoding system according to the related art.
Figure 3:
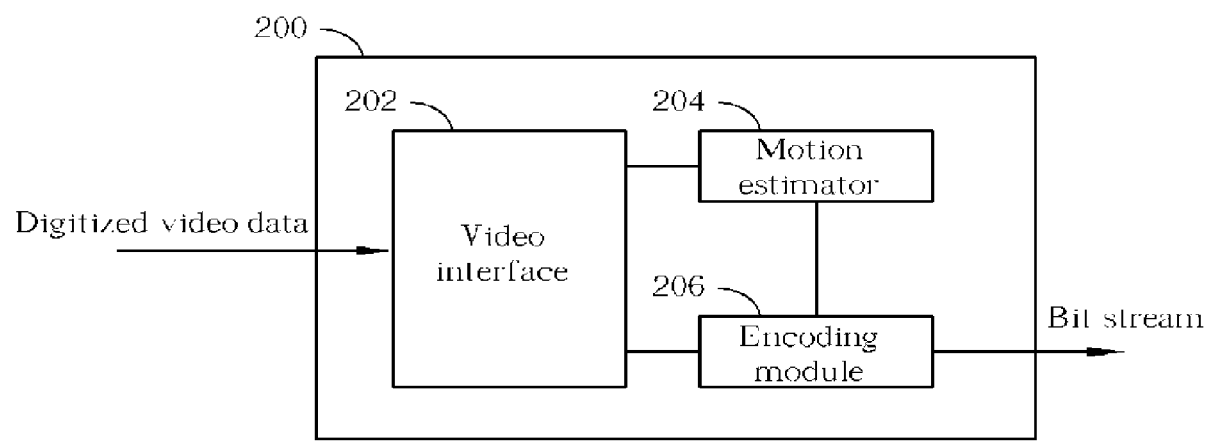
FIG. 3 is a simplified schematic diagram of a video encoding device according to the present invention.

FIG. 3 illustrates a schematic diagram of a video encoding device 200 according to one embodiment of the present invention. The video encoding device 200 is used for encoding digitized video data to generate an encoded bit stream. The video encoding device 200 includes a video interface 202 for receiving the digitized video data; a motion estimator 204, which is electrically connected to the video interface 202, used for performing motion estimation for each block in the digitized video data; and an encoding module 206, which is electrically connected to the video interface 202 and the motion estimator 204, used for controlling the encoding process and for encoding the motion estimated video data. For example, the encoding module 206 performs discrete cosine transform (DCT), quantization (Q), and variable length coding (VLC) to generate an encoded bit stream and performs inverse quantization ($Q^{-1}$), inverse discrete cosine transform ($DCT^{-1}$), and motion compensation (MC) to generate the reference picture required for motion estimation. The video encoding device 200 is electrically connected to a memory management unit (not shown), such as the memory management unit 20 of FIG. 2, to access a system memory (not shown).

When receiving digitized video data, the video interface 202 of the video encoding device 200 first performs noise cancellation, scaling, and other front-end operations. Afterward, the processed video data is transmitted from the video interface 202 to the encoding module 206 and the motion estimator 204. An adjustable video encoding method is employed in the encoding module 206 and the motion estimator 204 to adjust the encoding method according to the bandwidth information of the system memory. The video encoding method of this embodiment is described as follows.

Figure 4:
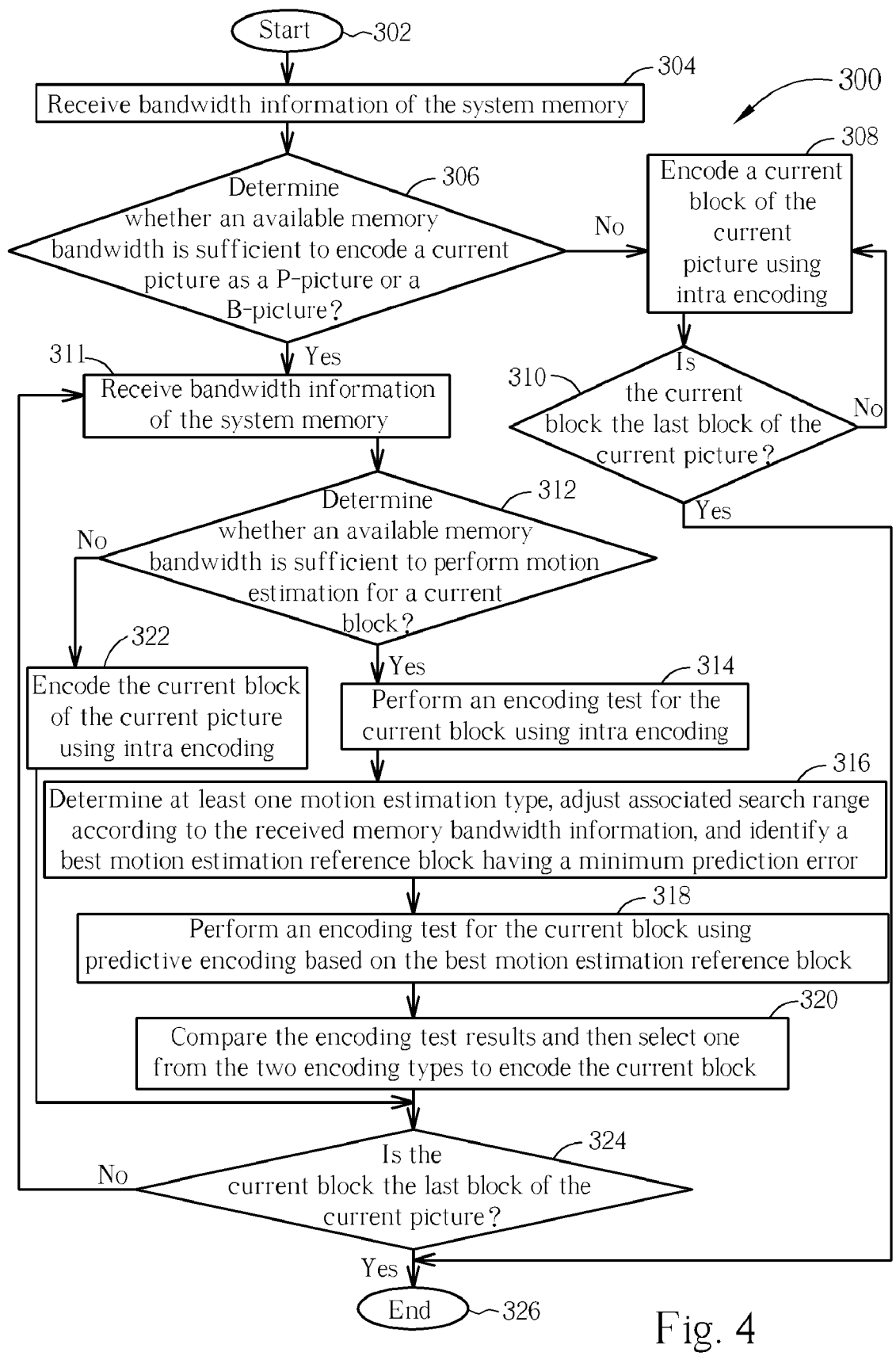
FIG. 4 is a flowchart of a video encoding method according to the present invention.

FIG. 4 illustrates a flowchart 300 of an adjustable video encoding method according to this embodiment. The method includes following steps:

Step 302: Start.

Step 304: The encoding module 206 receives bandwidth information of the system memory.

Step 306: The encoding module 206 determines whether or not an available memory bandwidth is sufficient to encode a current picture as a predictive picture (P-picture) or a bi-directionally predictive picture (B-picture) according to the received memory bandwidth information. If the available memory bandwidth is sufficient, then determine to encode the current picture as either a P-picture or a B-picture according the received memory bandwidth information and then go to step 311. If the available memory bandwidth is not sufficient, go to step 308 to encode the current picture as an intra-coded picture (I-picture).

Step 308: The encoding module 206 encodes a current block of the current picture using intra encoding.

Step 310: Check if the current block is the last block of the current picture. If it is true, go to step 326; otherwise, go back to step 308 to encode a next block.

Step 311: The motion estimator 204 receives bandwidth information of the system memory.

Step 312: The motion estimator 204 determines whether or not an available memory bandwidth is sufficient to perform motion estimation for a current block of the current picture according to the received memory bandwidth information. If the memory bandwidth is sufficient, go to step 314; otherwise, go to step 322.

Step 314: The encoding module 206 performs an encoding test for the current block using intra encoding.

Step 316: The motion estimator 204 determines at least one motion estimation type and adjusts associated search range according to the received memory bandwidth information. The motion estimator 204 then performs motion estimation based on each of the determined motion estimation types, respectively. Afterward, the motion estimator 204 compares the prediction errors of each of the determined motion estimation types to identify a best motion estimation reference block having a minimum prediction error.

Step 318: The encoding module 206 performs an encoding test for the current block using predictive encoding based on the best motion estimation reference block determined by the motion estimator 204.

Step 320: Compare the encoding test results obtained in step 314 and step 318 and then select one from the two encoding types to encode the current block by the selected encoding type.

Step 322: The encoding module 206 encodes the current block of the current picture using intra encoding.

Step 324: Check if the current block is the last block of the current picture. If it is true, go to step 326; otherwise, go back to step 311 to encode a next block.

Step 326: End.

The operation of the flowchart 300 is further described as follows. In step 302, the video interface 202 of FIG. 3 transmits the processed video data to the motion estimator 204 and the encoding module 206. In step 304, the video encoding device 200 then receives memory bandwidth information from the memory management unit, where the memory bandwidth information includes an available memory bandwidth for the video encoding device 200. In this embodiment both the motion estimator 204 and the encoding module 206 adjust their operations according to the available memory bandwidth.

In step 306, the encoding module 206 determines the encoding type of the current picture (a frame picture or a field picture) according to the available memory bandwidth. At that moment, if the available memory bandwidth of the video encoding device 200 is only sufficient to support encoding the current picture as an I-picture, the encoding module 206 then decides the encoding type of the current picture is intra encoding in step 306. Accordingly, in steps 308 and 310, the encoding module 206 encodes each block in the current picture as an intra-coded block. In the MPEG standard, the above-mentioned block could be a macro-block.

On the other hand, in step 306, if the available memory bandwidth is sufficient to support encoding the current picture as a P-picture or a B-picture, the encoding module 206 determines the encoding type of the current picture is either predictive encoding or bi-directionally predictive encoding based on the available memory bandwidth. For example, a first threshold Pth corresponding to the minimum required memory bandwidth for predictive encoding and a second threshold Bth corresponding to the minimum required memory bandwidth for bi-directionally predictive encoding are predetermined and available to the encoding module 206. If the available memory bandwidth is equal to or greater than the second threshold Bth, this means the current picture could be encoded as a B-picture. If the available memory bandwidth is less than the second threshold Bth but is equal to or greater than the first threshold Pth, this represents that the current picture could be encoded as a P-picture.

In one embodiment of the present invention, each of the first and second thresholds Pth and Bth is a predetermined value. In another embodiment, during the encoding process, the encoding module 206 keeps track of consumed memory bandwidth information of a plurality of previous pictures. The encoding module 206 updates the second threshold Bth with a minimum memory bandwidth actually consumed by bi-directionally predictive encoding up to now, and updates the first threshold Pth with a minimum memory bandwidth actually consumed for predictive encoding up to now.

Next, the motion estimator 204 receives bandwidth information of the system memory in step 311. Note that in this embodiment the memory bandwidth information received by the encoding module 206 in step 304 corresponds to a long-term memory bandwidth, and the memory bandwidth information received by the motion estimator 204 in step 311 corresponds to a short-term memory bandwidth. As a result, the video encoding device 200 of this embodiment is capable of efficiently utilizing the system memory in different situations.

In step 312, the motion estimator 204 compares the received memory bandwidth information with a third threshold Mth, which corresponds to a minimum required memory bandwidth for motion estimation, in order to determine whether or not the available memory bandwidth is sufficient to perform motion estimation for the current block. If the available memory bandwidth is not sufficient to perform motion estimation, the encoding module 206 encodes the current block as intra-coded in step 322. Similarly, in one embodiment, the third threshold Mth is a predetermined value. In another embodiment, during the motion estimation process, the motion estimator 204 keeps track of consumed memory bandwidth information of a plurality of preceding blocks and updates the third threshold Mth with a minimum memory bandwidth actually consumed for performing motion estimation.

On the other hand, if the motion estimator 204 determines the available memory bandwidth is sufficient to perform motion estimation for the current block in step 312, the encoding module 206 performs an encoding test for the current block using intra encoding.

In step 316, according to the available memory bandwidth for the video encoder and the encoding type of the current picture determined by the encoding module 206 in step 306, the motion estimator 204 determines at least one motion estimation type for the current block. The motion estimator 204 then performs motion estimation based on each of the determined motion estimation types, respectively, and compares the prediction errors of the different motion estimation types in order to identify a best motion estimation reference block having a minimum prediction error. The motion estimator 204 then transmits the motion vector and other related information obtained based on the best motion estimation to the encoding module 206.

According to the MPEG standard, if the encoding type of the current picture is predictive encoding, the encoding type of the current block could be intra encoding or forward motion compensation encoding. If the encoding type of the current picture is bi-directionally predictive encoding, the encoding type of the current block could be intra encoding, forward motion compensation encoding, backward motion compensation encoding, or bi-directional motion compensation encoding. It is also noted that in the MPEG 4 standard, if the encoding type of the current picture is bi-directionally predictive encoding, no intra-coded block exists within the current picture.

When encoding the current block as an intra-coded block, the motion estimator 204 does not need to perform motion estimation. When encoding the current block as a forward motion compensated block, the motion estimator 204 needs to perform forward prediction. When encoding the current block as a backward motion compensated block, the motion estimator 204 needs to perform backward prediction. When encoding the current block as a bi-directional motion compensated block, the motion estimator 204 needs to perform bi-directional prediction.

Additionally, in the MPEG 2 standard, for example, the motion estimator 204 not only needs to determine the encoding type for the current block in step 316, but also needs to determine a motion type for the current block according to both the type of the current picture (i.e., frame picture or field picture) and the encoding type of the current picture. The motion type parameter is used for representing the motion compensation method of the current block. In this embodiment, for example, the current picture is assumed as a frame picture and is going to be encoded using bi-directionally predictive encoding. In this situation, if the motion estimator 204 decides to perform forward prediction for the current block, it further needs to determine that the motion type of the current block is either frame-based prediction or field-based prediction in order to support the encoding module 206 to encode the current block using motion compensation encoding.

In other words, in step 316, the motion estimator 204 determines at least one motion estimation type and associated motion type for the current block based on the available memory bandwidth. For example, assuming the available memory bandwidth received in step 311 is sufficient to perform both forward frame-based prediction motion estimation or forward field-based prediction motion estimation, the motion estimator 204 performs forward motion estimation with the two motion types, respectively, and then compares their prediction errors. The motion estimator 204 selects a best motion estimation reference block having a minimum prediction error and transmits the motion vector and associated information obtained based on the best motion estimation reference block to the encoding module 206.

As mentioned above, in step 316, the motion estimator 204 typically performs motion estimation using a full search block-matching algorithm or a hierarchical search block-matching algorithm. In the preferred embodiment of the present invention, one technical feature is that the motion estimator 204 adjusts the search range of the block-matching algorithm according to the available memory bandwidth. For example, if the motion estimator 204 adopts the full search block-matching algorithm to implement motion estimation, the motion estimator 204 adjusts the search range for the full search block-matching algorithm based on the available memory bandwidth in step 316. When the available memory bandwidth is large, the motion estimator 204 configures a large search range; when the available memory bandwidth is small, the motion estimator 204 configures a small search range. On the other hand, if the motion estimator 204 adopts the hierarchical search block-matching algorithm to implement motion estimation, the motion estimator 204 adjusts the number of search levels and the search range of each level for the hierarchical search block-matching algorithm based on the available memory bandwidth in step 316.

In another embodiment, the motion estimator 204 can adopt both the full search block-matching algorithm and the hierarchical search block-matching algorithm and select one of them based on the available memory bandwidth to implement motion estimation. For example, if the available memory bandwidth is less than a bandwidth threshold Fth, the hierarchical search block-matching algorithm is selected; otherwise, the full search block-matching algorithm is selected. When the full search block-matching algorithm is selected, the motion estimator 204 of the present invention simultaneously adjusts the associated search range. When the hierarchical search block-matching algorithm is selected, the motion estimator 204 of the present invention adjusts both the number of search levels and the associated search range of each level.

In step 318, the encoding module 206 performs an encoding test for the current block using motion compensation encoding with the motion vector and other information of the best motion estimation reference block from the motion estimator 204.

As in the above illustration of the present invention, the video encoding device 200 performs various encoding tests for the current block (or macro-block) before encoding the current block in order to identify an encoding type that uses the fewest bits to encode the current block. Therefore, in step 320, the video encoding device 200 compares the test result of the motion compensation encoding obtained in step 318 with the test result of the intra encoding obtained in step 314. The better one of the two encoding types is selected as the actual encoding type for the current block.

For a block, the mean, variance, or other statistical values of the luminance of the pixels in the block represents the complexity of the image within the block. It is important to identify a more preferable encoding type among several candidate encoding types so that less bits would be consumed to encode the block. Accordingly, when the encoding module 206 compares the results of the two encoding tests in step 320, it can compare the mean, variance, or other statistical value of the luminance of the pixels in the block obtained in step 314 with the mean, variance, or other statistical value of the luminance prediction error of the pixels obtained in step 318 to select a better encoding type. The advantage of encoding test is the computation complexity of comparing different encoding types by mean, variance, or other statistical values is much less than actual encoding the block by these encoding types. Generally, the encoding type using the fewest bits is preferred to encode the current block. The principal of selecting the best encoding type depends on the requirement of system. For example, the encoding module 206 can select the encoding type with better image quality instead of minimum encoding bits to encode the current block.

Note that as the illustration of step 320, it is known that step 314 is not limited to be performed before step 316. In practical implementation, step 314 can be performed between step 316 and step 318 or after step 318.

In step 324, similar with step 310, the encoding module 206 checks if the current block is the last block of the current picture. If the current block is not the last block in the current picture, the encoding module 206 and the motion estimator 204 perform steps 312 through 324 to encode the next block.

Note that since the available memory bandwidth may vary after the current block is encoded, the motion estimator 204 determines whether to perform motion estimation or not according to the current situation of the available memory bandwidth in step 312 before encoding the next block.

After all blocks of the current picture are encoded, the encoding module 206 receives new bandwidth information of the system memory and determines a feasible encoding type for a next picture.

Please note that in practical implementations, the block-matching algorithm employed by the motion estimator 204 can be the full search block-matching algorithm or the hierarchical search block-matching algorithm but is not limited to these two block-matching algorithms. In fact, other block-matching algorithms that have memory bandwidth requirement being related to the size of the search area (or number of search level) can also be used by the present invention.

In the foregoing embodiment, the MPEG 2 standard is employed as an example. Since a B-picture cannot comprise intra-coded blocks in the MPEG 4 standard, the video encoding method of the present invention can be simplified to support the MPEG 4 standard by modifying the steps.

Figure 5:
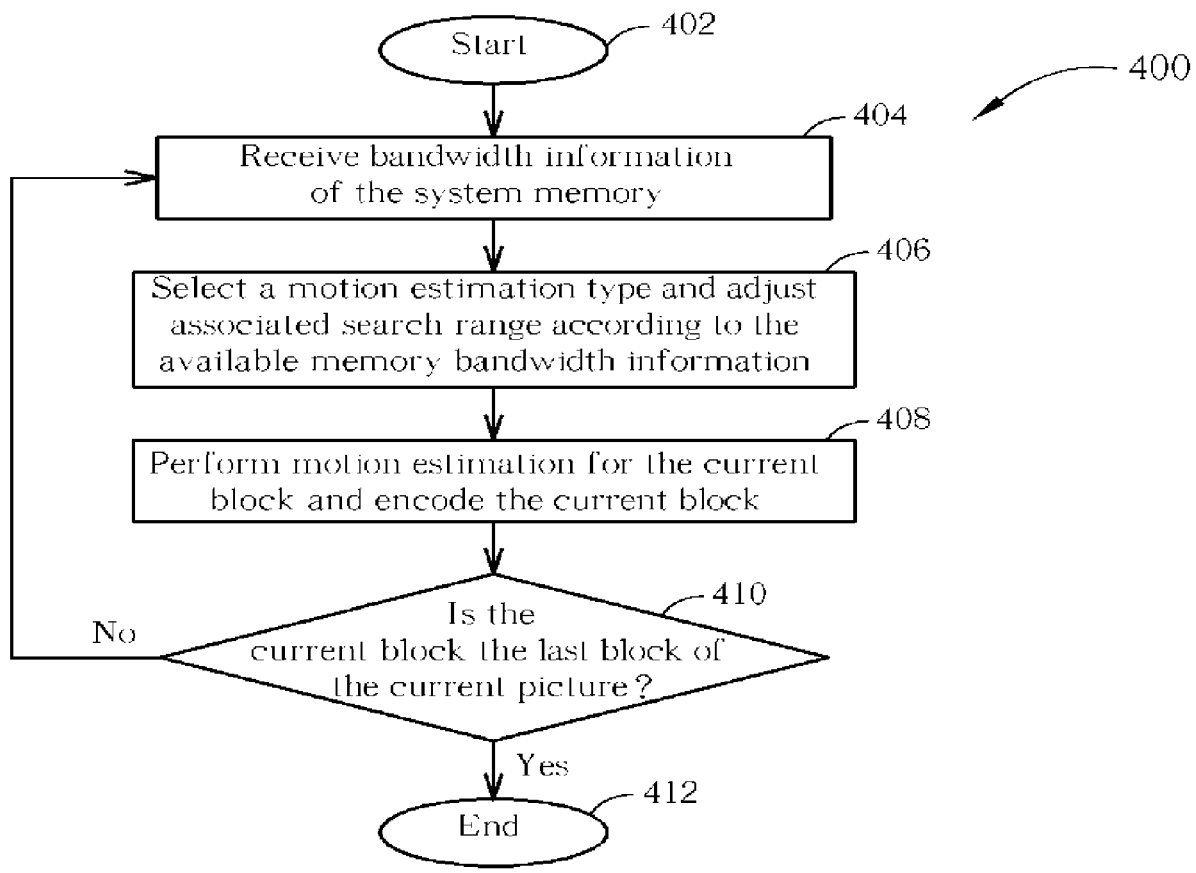
FIG. 5 is a flowchart of another video encoding method according to the present invention.

Please refer to FIG. 5 as well as to FIG. 4. FIG. 5 depicts a flowchart 400 according to another embodiment of the present invention. The flowchart 400 is the simplified version of the flowchart 300 shown in FIG. 4. The operation of the flowchart 400 is similar to the flowchart 300. The difference is that the flowchart 400 is feasible for encoding a picture that does not include intra-coded blocks. For example, in the MPEG 4 standard, a B-picture does not include any intra-coded blocks. In practice, the flowchart 300 of FIG. 4 can be modified to cover the concept of the flowchart 400 by adding suitable determining blocks. Obviously, the video encoding method of the present invention is feasible to encode pictures and blocks in any encoding type.

As mentioned, the memory bandwidth limitation available for video decoding is the main concern of the video encoding method of the present invention. The corresponding encoding type of each picture or block to be encoded is adjusted based on the memory bandwidth available for video encoding. When a current block is encoded, the encoding type of the next block is adjusted according to the latest memory bandwidth situation, so that the required memory bandwidth while encoding each block of the current picture does not exceed the memory bandwidth available for video encoding. In other words, applying the video encoding method disclosed in the present invention can solve the problem of interrupting the real-time encoding process due to the memory bandwidth limitations of the related art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a video encoder to encode video data into a video bit stream, the video data includes at least a picture, the method comprising:
   (a) receiving an available memory bandwidth value;
   (b) determining an encoding type for the picture according to the available memory bandwidth value; and
   (c) encoding the picture using the encoding type.

2. The method of claim 1, wherein step (b) further comprises:
determining the encoding type for the picture by comparing the available memory bandwidth value with a first threshold value; and
setting the encoding type of the picture as intra encoding when the available memory bandwidth value is less than the first threshold value.

3. The method of claim 2, wherein step (b) further comprises:
if the available memory bandwidth value is not less than the first threshold value, comparing the available memory bandwidth value with a second threshold value; and
setting the encoding type of the picture as predictive encoding when the available memory bandwidth value is between the first and second threshold values.

4. The method of claim 3, further comprising:
adaptively updating the first or second threshold value while encoding the video data.

5. The method of claim 2, wherein step (b) further comprises:
if the available memory bandwidth value is not less than the first threshold value, comparing the available memory bandwidth value with a second threshold value; and
setting the encoding type of the picture as bi-directionally predictive encoding when the available memory bandwidth value is greater than the second threshold value.

6. The method of claim 5, further comprising:
adaptively updating the first or second threshold value while encoding the video bit stream.

7. The method of claim 1, wherein the picture is a frame picture or a field picture.

8. The method of claim 1, wherein the encoding type is intra encoding, predictive encoding, or bi-directionally predictive encoding.

9. A method for a video encoder to encode video data into a video bit stream, the video data includes at least a picture, the picture includes a plurality of blocks, the method comprising:
(a) receiving an available memory bandwidth value;
(b) determining an encoding type for the block according to the available memory bandwidth value; and
(c) encoding the block using the encoding type.

10. The method of claim 9, wherein the picture is a frame picture or a field picture.

11. The method of claim 9, wherein the block is a macroblock.

12. The method of claim 9, wherein the encoding type of the block is intra encoding, forward motion compensation encoding, backward motion compensation encoding, or bi-directional motion compensation encoding.

13. The method of claim 9, wherein step (b) further comprises:
determining the encoding type for the block by comparing the available memory bandwidth value with a threshold; and
setting the encoding type of the block as intra encoding when the available memory bandwidth value is less than the threshold value.

14. The method of claim 13, wherein step (b) further comprises:
when the available memory bandwidth value is not less than the threshold value, determining a plurality of candidate motion estimation types and adjusting a plurality of search ranges associated with the candidate motion estimation types according to the available memory bandwidth value and an encoding type of the picture;
performing motion estimation for the block based on the candidate motion encoding types; and
comparing prediction errors of the motion estimation types to identify a motion estimation reference block having a minimum prediction error for determining the encoding type for the block.

15. The method of claim 14, wherein step (b) further comprises:
performing a first encoding test on the block using intra encoding;
performing a second encoding test on the block using the motion estimation reference block; and
comparing results of the first and second encoding tests to determine the encoding type for the block.

16. The method of claim 13, wherein step (b) further comprises:
when the available memory bandwidth value is not less than the threshold value, determining a motion estimation type and adjusting a search range associated with the motion estimation type according to the available memory bandwidth value and an encoding type of the picture for determining the encoding type for the block.

17. The method of claim 16, wherein step (b) further comprises:
performing a first encoding test on the block using intra encoding;
performing a second encoding test on the block using the motion estimation type; and
comparing results of the first and second encoding tests to determine the encoding type for the block.

18. The method of claim 13, further comprising:
adaptively updating the threshold value while encoding the picture.

19. The method of claim 9, wherein the encoding type of the block is intra encoding or forward motion compensation encoding when an encoding type of the picture is predictive encoding.

20. The method of claim 9, wherein the encoding type of the block is intra encoding, forward motion compensation encoding, backward motion compensation encoding, or bi-directional motion compensation encoding when an encoding type of the picture is bi-directionally predictive encoding.

21. The method of claim 9, wherein the encoding type of the block is forward motion compensation encoding, backward motion compensation encoding, or bi-directional motion compensation encoding when an encoding type of the picture is bi-directionally predictive encoding.

22. A method for performing a motion estimation on a block of a picture, comprising:
(a) receiving an available memory bandwidth value;
(b) determining a motion estimation type and a search range associated with the motion estimation type for the block according to the available memory bandwidth value; and
(c) performing the motion estimation on the block according to the motion estimation type and the search range.

23. The method of claim 22, wherein the block is a macroblock.

24. The method of claim 22, wherein the motion estimation type is forward estimation, backward estimation, or bi-directionally estimation.

25. The method of claim 22, wherein step (b) further comprises determining a motion type for the block according to the motion estimation type, and step (c) further comprises performing the motion estimation on the block according to the motion estimation type, the search range, and the motion type.

26. The method of claim 22, wherein step (c) further comprises using a full search motion estimation algorithm to perform the motion estimation on the block.

27. The method of claim 22, wherein step (b) further comprises determining a total number of search levels and a search range of each search level according to the available memory bandwidth value; and step (c) further comprises using a hierarchical search motion estimation algorithm to perform the motion estimation on the block.

28. The method of claim 22, wherein step (b) further comprises:
determining the motion estimation type and the search range for the block according to the available memory bandwidth value and an encoding type of the picture.

29. The method of claim 28, wherein the encoding type of the picture is intra encoding, predictive encoding, or bi-directionally predictive encoding.

30. The method of claim 28, wherein step (b) further comprises determining a total number of search levels and a search range of each search level for the block according to the encoding type of the picture and the available memory bandwidth value; and step (c) further comprises using a hierarchical search motion estimation algorithm to perform the motion estimation on the block.

31. The method of claim 22, wherein the picture is a frame picture or a field picture.

32. An apparatus for encoding video data into a video bit stream, comprising:
means for receiving an available memory bandwidth value;
means for determining an encoding type for the video bit stream according to the available memory bandwidth value; and
means for encoding the video bit stream using the encoding type.

33. An apparatus for performing a motion estimation on a block of a picture, comprising:
first means for receiving an available memory bandwidth value;
second means for determining a motion estimation type and a search range associated with the motion estimation type for the block according to the available memory bandwidth value; and
third means for performing the motion estimation on the block according to the motion estimation type and the search range.

34. The apparatus of claim 33, wherein the motion estimation type is forward estimation, backward estimation, or bi-directionally estimation.

35. The apparatus of claim 33, wherein the second means further comprises determining a motion type for the block according to the motion estimation type, and the third means further performs the motion estimation on the block according to the motion estimation type, the search range, and the motion type.

36. The apparatus of claim 33, wherein the third means further performs the motion estimation on the block using a full search motion estimation algorithm.

37. The apparatus of claim 33, wherein the second means further determines a total number of search levels and a search range of each search level according to the available memory bandwidth value, and the third means further performs the motion estimation on the block using a hierarchical search motion estimation algorithm.

38. A video encoder for encoding video data into a video bit stream, comprising:
a video interface for receiving the video data; and
an encoding module electrically connected to the video interface for adaptively determining an encoding type for the video bit stream according to an available memory bandwidth value, and then for encoding the picture using the encoding type.

39. The video encoder of claim 38, further comprising:
a motion estimator electrically connected to the video interface and the encoding module, the motion estimator for adaptively determining a motion estimation type and a search range associated with the motion estimation type for the block according to an available memory bandwidth value; and for performing the motion estimation on the block according to the motion estimation type and the search range.

40. The video encoder of claim 39, wherein the motion estimator performs the motion estimation on the block using a full search motion estimation algorithm or a hierarchical search motion estimation algorithm.

* * * * *